3,316,317
ALKYLATION PROCESS
Hans A. Benesi, Berkeley, Calif., assignor to Shell Oil Company, New York, N.Y., a corporation of Delaware
No Drawing. Filed June 24, 1964, Ser. No. 377,484
14 Claims. (Cl. 260—671)

ABSTRACT OF THE DISCLOSURE

A process for alkylation of aromatic hydrocarbons with an olefin at an elevated temperature with a catalyst comprising silver incorporated with an active acid-acting refractory oxide.

---

This invention relates to the alkylation of aromatics with olefins.

The alkylation of aromatics with olefins is a well known and commercially practiced reaction. For example, benzene is alkylated with propylene tetramer for the manufacture of detergents or with ethylene to make ethyl benzene which is converted into styrene for the plastics and rubber industry or with propylene to make cumene or diisopropyl benzene as intermediates in the chemical and plastics industry. Catalysts employed in commercial alkylation processes include, for example, aluminum chloride, usually with a promoter such as ethyl chloride, or solid phosphoric acid catalysts. The use of these catalysts is described by E. K. Jones, "Advances in Catalysis," 10, pages 182–188 (1958).

The alkylation catalysts in commercial use have several serious disadvantages. Aluminum chloride is rather corrosive and causes relatively high capital costs and high equipment maintenance costs. Solid phosphoric acid eliminates many of these corrosion problems, but water in the feed to the reaction zone must be carefully controlled, otherwise the catalyst can also cause corrosion when water combines with $P_2O_5$ to form corrosive $H_3PO_4$. Excessive water also tends to plug the phosphoric acid catalyst bed.

It has now been found that aromatics can be alkylated with olefins at an elevated temperature by means of a catalyst comprising silver in combination with an acid-acting refractory oxide, e.g. such as those active for cracking hydrocarbons. In accordance with the process of the invention, aromatics having from 6 to about 10 carbon atoms are alkylated with olefins having from 2 through about 12 carbon atoms, preferably from 2 through 4 carbon atoms, at a temperature in the range from about 200 to 500° C. with a catalyst comprising silver in combination with an acid-acting refractory oxide. Silver is particularly active for the alkylation reaction. In a preferred embodiment, the alkylation reaction is effected in the presence of hydrogen at a pressure in the range from about 100 to 1500 p.s.i. and a hydrogen to hydrocarbon mole ratio in the range from about 1:1 to about 50:1.

Aromatic hydrocarbons which are alkylated in the process of the invention are those having 6 to 10 carbon atoms per molecule and preferably monoaromatic, e.g., benzene or an alkyl aromatic hydrocarbon.

Thus, for example, benzene can be alkylated with ethylene to make ethyl benzene or cumene can be alkylated with propylene to make diisopropyl benzene or, if desired, toluene can be alkylated with ethylene, propylene and the like. Although aromatics can be alkylated with olefins having from 2 to about 12 carbon atoms per molecule, it is preferred to employ light olefins, e.g., mono-olefins having from 2 through 4 carbon atoms per molecule such as ethylene, propylene, and butylene.

The alkylation catalyst comprises an acid-acting refractory oxide catalyst having incorporated therewith from about 0.1 to about 10% silver. Particularly desirable acid-acting catalysts are those having cracking activity such as synthetic and natural silica-alumina, silica-zirconia, silica-titania, silica-titania-zirconia, silica-magnesia, alumina-boria, and the like. Synthetic silica-alumina having from about 60 to 90% silica and 40 to 10% alumina is especially preferred. Such catalysts and their preparation are well known in the art. In general, cracking catalysts are amorphous materials. If it is desired to use crystalline alumino silicates, known as molecular sieves, in the present catalysts, it is preferred that excessive catalytic acidity be neutralized in a suitable manner.

It is generally desirable to incorporate in the catalyst from about 0.1 to 5% by weight halogen. Fluorine is a particularly suitable halogen for use in the catalyst of the present invention.

The silver can be incorporated with the cracking catalyst by any suitable method. Thus, silver catalysts can be prepared by impregnation of the cracking catalyst with a decomposable silver salt, e.g. an aqueous solution of silver nitrate, or by coprecipitation of a silver salt with the silica-alumino cracking catalyst or by ion-exchange of silver ions into the synthetic cracking catalyst. For ion-exchange, the cracking catalyst can be in the form of a hydrogel or xerogel.

The process of the invention is carried out at a temperature in the range from about 200 to 500° C. and preferably from about 250 to 350° C. Space velocity can vary over a wide range such as from about 0.1 to 10 but is preferably in the range from about 0.5 to 2. Space velocity as the term is used herein refers to WHSV and is expressed as the weight of olefin per hour per unit weight of catalyst. The alkylation is generally carried out with a molar excess of aromatic, preferably in the range from about 2 to about 10 moles of aromatic per mole of olefin.

The alkylation reaction preferably is carried out in the presence of hydrogen although there is little or no net consumption of hydrogen in the process. The presence of hydrogen functions to improve olefin conversion although selectivity of the conversion of olefin to alkylaromatics may be adversely affected owing to hydrogenation of a portion of the olefin. The presence of hydrogen also functions to improve the catalyst life, apparently by preventing polymerization of intermediate reaction products which would otherwise polymerize and deposit on the catalyst. A hydrogen to hydrocarbon mole ratio of from about 1:1 to 50:1, preferably from about 1:1 to 4:1 is used. It is preferred to use relatively pure hydrogen e.g. gases containing over 50% hydrogen, preferably containing above 90% hydrogen. Total pressure can be in the range from about 100 to 1500 p.s.i.g. and preferably from about 600 to 1000 p.s.i.g.

Example 1

The alkylation of benzene with ethylene was conducted with various catalysts at a temperature of 300° C. and a pressure of 300 p.s.i. in the presence of hydrogen. The molar proportion of hydrogen to benzene to ethylene was 72:6:1. Catalyst 1 is a silica-alumina cracking catalyst containing approximately 25% by weight alumina. Catalyst 2 was prepared by contacting the silica-alumina of catalyst 1 with ammonium bifluoride followed by washing, drying, and calcining. Catalyst 3 was prepared by treating the silica-alumina of catalyst 1 with ammoniacal silver nitrate solution to exchange silver ammine ions into the silica-alumina, followed by washing, drying and calcining. Catalyst 4 comprises silver, fluorine, and silica-alumina and was prepared by contacting the silica-alumina xerogel of catalyst 1 with an aqueous solution containing ammonium fluoride, silver nitrate and ammonium hydroxide. The product was washed, dried and calcined. Catalyst 5 comprises nickel, fluorine, and silica-alumina and was prepared by ion-exchanging nickel cations into silica-alumina hydrogel. Fluoride was incorporated into the silica-alumina hydrogel by contacting the hydrogel with ammonium bifluoride solution. The catalyst was presulfided in $H_2S$ prior to use. Catalyst 6 is the hydrogen form of mordenite, a synthetic, crystalline aluminosilicate sold under the trade name Zeolon by the Norton Co. Catalyst 7 is silver mounted on H-mordenite prepared by ion exchanging silver ions from a silver nitrate solution with the ammonium form of mordenite followed by washing, drying, and calcining. Catalyst 8 is a commercial alkylation catalyst sold by Universal Oil Products and consists of phosphoric acid supported on kieselguhr.

TABLE 1.—ALKYLATION OF BENZENE WITH ETHYLENE IN THE PRESENCE OF HYDROGEN

[Temperature=300 °C; pressure=300 p.s.i.g.; molar proportions of hydrogen to benzene to ethylene=72:6:1]

| Catalyst | | WHSV[a] | Ethylene Conversion, percent | Percent Selectivity to— | |
|---|---|---|---|---|---|
| | | | | Ethyl-benzenes[b] | Ethane |
| 1 | Silica-alumina | 0.4 | 20 | 70 | 30 |
| 2 | F/silica-alumina | 0.4 | 20 | 73 | 27 |
| 3 | Ag/silica-alumina | 0.5 | 58 | 87 | 13 |
| 4 | Ag/F/silica-alumina | 0.5 | 93 | 92 | 8 |
| | | 2.0 | 38 | 87 | 13 |
| 5 | Ni/F/silica-alumina[c] | 2.2 | 60 | 1 | 99 |
| 6 | H-mordenite | 0.5 | 17 | 5 | 95 |
| 7 | Ag/H-mordenite | 0.5 | 31 | 15 | 85 |
| 8 | $H_3PO_4$/kieselguhr | 0.1 | 5.5 | 23 | 77 |

[a] Weight of ethylene per hour that passes over a unit weight of catalyst.
[b] Includes mono-, di-, and triethylbenzenes.
[c] Presulfided in $H_2S$.

From the results given in Table 1 it can be seen that conversion is quite low with the silica-alumina cracking catalyst and with the H-mordenite. The incorporation of fluorine in the silica-alumina had no effect on conversion and little significant effect on selectivity for conversion of ethylene to ethyl benzenes. The addition of silver to the silica-alumina or to the H-mordenite markedly improves conversion and selectivity. The combination of silver and fluorine with silica-alumina provides excellent conversion and excellent selectivity. In contrast, the sulfided nickel fluoride silica-alumina catalyst gave very poor selectivity due to the hydrogenation of ethylene to ethane. It is to be noted that the commercial phosphoric acid alkylation catalyst, even at very low space velocities, gave a very low conversion and low selectivity.

Example 2

The effect of hydrogen on the conversion reaction is demonstrated in the following experiment for the alkylation of benzene with ethylene. Again as in Example 1, a temperature of 300 °C. and a pressure of 300 p.s.i.g. were employed. However, in this case nitrogen was used instead of hydrogen. The molar proportion of nitrogen to benzene to ethylene was 72:6:1. Results are given in Table 2. It can be seen that the silica-alumina gives no conversion and that the silver fluoride silica-alumina catalyst is still superior to the phosphoric acid alkylation catalyst although activity is markedly reduced from that obtained in Example 1.

TABLE 2.—ALKYLATION OF BENZENE WITH ETHYLENE IN THE PRESENCE OF NITROGEN

[Temperature=300° C; pressure=300 p.s.i.g.; molar proportions of nitrogen to benzene to ethylene=72:6:1]

| Catalyst | WHSV | Ethylene Conversion, Percent | Percent Selectivity to— | |
|---|---|---|---|---|
| | | | Ethyl-benzenes | Ethane |
| $H_3PO_4$/kieselguhr | 0.1 | 1.2 | 100 | 0 |
| Silica-alumina | 0.4 | 0 | | |
| Ag/F/silica-alumina | 2.2 | 3 | 100 | 0 |

I claim as my invention:

1. A process of the alkylation of an aromatic hydrocarbon with an olefin which comprises contacting said aromatic and said olefin at an elevated temperature with a catalyst comprising silver incorporated with an active acid-acting refractory oxide.

2. A process of akylating an aromatic hydrocarbon having from 6 to about 10 carbon atoms with an olefin having from 2 to about 12 carbon atoms which comprises contacting said aromatic and said olefin in the presence of hydrogen at a temperature in the range from about 200 to about 500° C., a pressure in the range from about 100 to 1500 p.s.i. with a catalyst comprising silver incorporated with an active acid-acting refractory oxide.

3. The process according to claim 2 wherein the catalyst contains fluorine.

4. The process according to claim 2 wherein the acid-acting refractory oxide is silica-alumina cracking catalyst.

5. A process for the alkylation of a monoaromatic hydrocarbon having from 6 to about 10 carbon atoms per molecule with an olefin having from 2 to about 12 carbon atoms which comprises contacting said monoaromatic and said olefin in the presence of hydrogen at a temperature in the range from about 200 to 500° C., and a pressure of about 100 to 1500 p.s.i., with a catalyst comprising silver incorporated with an acid-acting refractory oxide.

6. A process according to claim 5 wherein the catalyst contains fluorine.

7. The process according to claim 5 wherein the monoaromatic hydrocarbon is benzene.

8. The process according to claim 5 wherein the olefin is propylene.

9. A process according to claim 5 wherein the olefin is ethylene.

10. A process for the alkylation of a monoaromatic hydrocarbon having from 6 to about 10 carbon atoms per molecule with an olefin having from 2 to about 12 carbon atoms which comprises contacting said monoaromatic and said olefin in the presence of hydrogen at a temperature in the range from about 200 to 500° C., and a pressure of about 100 to 1500 p.s.i., with a catalyst comprising silver incorporated with silica-alumina.

11. A process for the alkylation of an aromatic hydrocarbon having from 6 to about 10 carbon atoms with an olefin having from 2 to about 12 carbon atoms which comprises contacting said aromatic and said olefin at a temperature in the range from about 200 to 500° C. with a catalyst comprising silver incorporated with an active acid-acting refractory oxide.

12. The process according to claim 11 wherein the acid-acting refractory oxide is silica-alumina cracking catalyst.

13. The process according to claim 11 wherein the acid-acting refractory oxide is a crystalline aluminosilicate.

14. The process according to claim 13 wherein the alkylation is effected in the presence of hydrogen at a hydrogen to hydrocarbon mole ratio of about 1:1 to about 50:1.

References Cited by the Examiner

UNITED STATES PATENTS 3,104,268  9/1963  Kovach _____ 220—668 X

FOREIGN PATENTS 450,341  8/1948  Canada.

DELBERT E. GANTZ, *Primary Examiner.*

C. R. DAVIS, *Assistant Examiner.*